United States Patent
Kilian

(10) Patent No.: US 8,306,658 B2
(45) Date of Patent: Nov. 6, 2012

(54) FIELD DEVICE FOR PROCESSING DATA AND PARAMETERS IN A DECENTRALISED AUTOMATION SYSTEM

(75) Inventor: Markus Kilian, Freiburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 1233 days.

(21) Appl. No.: 11/794,324

(22) PCT Filed: Nov. 29, 2005

(86) PCT No.: PCT/EP2005/056332
§ 371 (c)(1),
(2), (4) Date: Jan. 22, 2008

(87) PCT Pub. No.: WO2006/072513
PCT Pub. Date: Jul. 13, 2006

(65) Prior Publication Data
US 2011/0153078 A1    Jun. 23, 2011

(30) Foreign Application Priority Data
Dec. 30, 2004   (DE) .......................... 10 2004 063 776

(51) Int. Cl.
*G05B 19/04* (2006.01)
(52) U.S. Cl. ........................... 700/247; 710/305; 700/19
(58) Field of Classification Search .................. 700/247, 700/19; 710/305
See application file for complete search history.

(56) References Cited

U.S. PATENT DOCUMENTS

| | | | |
|---|---|---|---|
| 6,023,399 A * | 2/2000 | Kogure | 361/23 |
| 6,095,674 A | 8/2000 | Verissimo | |
| 6,411,923 B1 * | 6/2002 | Stewart et al. | 703/25 |
| 6,594,530 B1 * | 7/2003 | Glanzer et al. | 700/18 |
| 7,010,294 B1 * | 3/2006 | Pyotsia et al. | 455/420 |
| 7,058,542 B2 * | 6/2006 | Hauhia et al. | 702/183 |
| 7,162,312 B2 * | 1/2007 | Gross et al. | 700/79 |
| 7,167,762 B2 * | 1/2007 | Glanzer et al. | 700/79 |
| 7,634,555 B1 * | 12/2009 | Wainscott et al. | 709/223 |
| 7,643,639 B2 * | 1/2010 | Kaszkin et al. | 380/277 |
| 2002/0131454 A1 * | 9/2002 | Franke et al. | 370/503 |
| 2003/0236579 A1 * | 12/2003 | Hauhia et al. | 700/79 |
| 2005/0066241 A1 * | 3/2005 | Gross et al. | 714/48 |
| 2005/0177708 A1 * | 8/2005 | Stinus et al. | 713/1 |
| 2005/0188351 A1 * | 8/2005 | Hoefler et al. | 717/106 |

FOREIGN PATENT DOCUMENTS

| | | |
|---|---|---|
| DE | 196 09 442 A1 | 9/1997 |
| DE | 197 50 026 A1 | 6/1999 |
| DE | 699 02 503 T2 | 8/2000 |
| DE | 101 31 530 A1 | 7/2002 |

(Continued)

*Primary Examiner* — Ramesh Patel
*Assistant Examiner* — Anthony Whittington
(74) *Attorney, Agent, or Firm* — Bacon & Thomas, PLLC

(57) ABSTRACT

A field device for data- and parameter-processing in a decentralized automation system, wherein other connected fieldbus components of the decentralized automation system communicate with one another via a fieldbus connected to the field device, and wherein a unified automation system is formed from a plurality of encapsulated function blocks, which run decentralized in the individual fieldbus components of the fieldbus and communicate with one another. An object of the invention, therefore, is to provide a function block for field devices of process automation technology, which enables a simple, controlled storage of data and/or parameters from the various function blocks of the decentralized units of the automation system and which permits an autonomous re-parametering of the function blocks of the relevant field device.

10 Claims, 2 Drawing Sheets

FOREIGN PATENT DOCUMENTS

| | | |
|---|---|---|
| DE | 101 48 029 A1 | 4/2003 |
| DE | 101 62 853 C1 | 6/2003 |
| DE | 102 59 342 A1 | 7/2004 |
| DE | 10 2004 009 598 A1 | 9/2004 |
| EP | 1 416 400 A3 | 5/2004 |
| WO | WO 98/14851 | 4/1998 |

* cited by examiner

FIELD DEVICE FOR PROCESSING DATA AND PARAMETERS IN A DECENTRALISED AUTOMATION SYSTEM

TECHNICAL FIELD

The present invention relates to a field device for data- and parameter-processing in a decentralized automation system, wherein other connected fieldbus components of the decentralized automation system communicate with one another via a fieldbus connected to the field device, and wherein a unified automation system is formed from a plurality of encapsulated function blocks, which run decentralized in separate fieldbus components of the field bus and which communicate with one another.

BACKGROUND DISCUSSION

A large number of such field devices, which are integratable in such a decentralized automation system, are manufactured and sold by the firm Endress+Hauser.

Progress in the field of microelectronics in recent years has led to a miniaturizing of devices and integration of functionalities. This has brought about effective and cost-favorable application of such integrated, decentralized systems in automation technology. Thus, in field devices with sensors and actuators, not only are measured values ascertained, but, also, the measured values are preprocessed and linearized, and self-diagnosis routines are implemented in the sensors or actuators. Prerequisites for introduction of these decentralized functionalities into a closed, automation design with "intelligent" sensors and actuators are increased information exchange between the decentralized units and, further, the preprocessing and storing of data and parameters in the units.

As a rule, decentralized units, or field devices, in modern automation installations are connected with a control system via a fieldbus, e.g. Profibus, Foundation Fieldbus. The control system serves for process control, process visualization, and process monitoring, as well as for configuring and parametering the decentralized units, or field devices.

The individual field devices perform various functions within the decentralized automation system. For special, standard functions, e.g. a PID-controller, so-called function blocks are available with defined communication interfaces. These function blocks form, with corresponding algorithms, which are executed in the microprocessors of the individual field devices, special application functions. In order that these function blocks can communicate with one another, an essential aspect of the function blocks resides in their having defined interfaces, so that they can be simply linked for complex control strategies of an automation system. In the Foundation Fieldbus specifications, various standard function blocks are specified. Typical function blocks for field devices are, for example, analog input AI, analog output AO, and PID-controller PID. Fieldbus Foundation has specified flexible function blocks, which are freely programmable according to the IEC-standard 61131.

Before a decentralized unit, or field device, can be used in a decentralized automation system, it must be configured and parametered. Necessary to accomplish this is, among other things, the loading of the control strategy into the corresponding field devices. Known applications enabling this loading include, for example, the SysCon system of the firm, SMAR, or DeltaV of the firm, Emerson. With these applications, it is also possible to test the correct networking of the individual function blocks, as well as the time flow of the control strategy of the decentralized units. Only following the function test is the control strategy loaded into the decentralized automation system. For changing the parameters of a function block, such must first be opened within a suitable servicing program. Then, the parameters of this function block shown in the servicing program can be changed by the user. If a number of parameters of a control loop must be changed, then the corresponding individual function blocks must be sequentially found, opened, and the required parameter changes effected within the servicing program. A re-parametering during operation of the field device, or the decentralized automation system, is, thus, not possible.

Additionally, it has long been possible to store data and process values in the control loop of a decentralized automation system, either globally in the control system or locally in the field devices. In the case of the local storage, however, this possibility is exclusively the storage of data, parameters and process values that have arisen in the particular field device. Data, parameters and process values of other field devices can not be stored.

SUMMARY OF THE INVENTION

An object of the present invention is to provide, for field devices of process automation technology, a function block enabling a simple, controlled storage of data and/or parameters from the various function blocks of decentralized units of an automation system and permitting an autonomous re-parametering of the function blocks of the relevant field device.

This object is achieved by providing in the field device a data storage function block, which, on the basis of a time- or event-controlled criterion, accepts data and/or parameters of other function blocks and stores such in a storage medium provided in the field device. This data storage function block makes possible a selection of the data to be stored. Storage of data and process values present on the inputs of the data storage function block occurs only after a certain storage criterion is fulfilled. This storage criterion can be pre-set in the algorithm of the data storage function block or placed in the storage medium and can, for example, include a logic combination of the input signals, delay time, length of time, threshold value, signal state and/or critical process values.

An advantageous embodiment of the invention includes that the data storage function block outputs data and/or parameters, stored on the basis of a time-controlled or event-controlled criterion, from a storage medium provided in the field device and transmits such to appropriate function blocks. Via a read criterion placed in the data storage function block, which is triggered, in turn, by a signal state on at least one input of the data storage function block, the corresponding data, process values and/or parameters are output from the storage medium to appropriate function blocks.

A very advantageous variant of the solution of the invention provides that the data storage function block enables an autonomous parametering of the function blocks in the field device by providing that the new data and/or parameters are loadable into the function blocks of the field device from the storage medium of the data storage function block. By this function of the data storage function block, a re-parametering of the other function blocks in the field device is possible, as triggered by a criterion.

A very advantageous variant of the solution of the invention provides that the data storage function block is embodied in the field device as a parameterable, flexible function block.

An especially advantageous, further development of the solution of the invention provides that the time- or event-controlled criterion of at least one function block, which is located in the decentralized automation system outside of the field device with the integrated data storage function block, starts the reparametering process or the storage routine.

An advantageous embodiment of the solution of the invention provides that the storage medium located in the field device and/or the fieldbus components is embodied as at least one removable data carrier.

By providing the data medium in the form of a removable data carrier, such can be removed from the field device, and, at an external data processing device, the data, process values and parameters can be read out, or new parameter data sets can be saved on the removable data carrier.

In an advantageous form of embodiment of the solution of the invention, it is provided that an external device, which is located outside of the decentralized automation system, stores the data and/or parameters in the removable data carrier, and, thus, an external preparametering of the function blocks in the decentralized automation system is provided.

An advantageous embodiment of the solution of the invention provides that an external device, which is located outside of the decentralized automation system, reads the stored data and/or parameters out of the removable data carrier and externally analyzes and further processes the stored data and/or parameters.

An advantageous, alternative embodiment of the device of the invention provides that the stored data and/or parameters are stored in the removable data carrier as structured data, for example as a database, XML-format.

A very advantageous variant of the solution of the invention provides that the time- or event-controlled criterion, which triggers a storage routine of data and/or parameters of the function blocks in the data storage function block, is at least a critical, limit-value data and/or parameter, a state at the input or a logic combination of states at the inputs of the data storage function block, or a certain time sequence.

An advantageous form of embodiment of the solution of the invention provides that the function blocks meet the specifications of the Profibus standard or the Foundation Fieldbus standard.

BRIEF DESCRIPTION OF THE DRAWINGS

The invention will now be explained in greater detail on the basis of the appended drawings. For simplification, identical parts in the drawings are provided with identical reference characters. The figures show as follows.

DETAILED DISCUSSION

Figure 1:
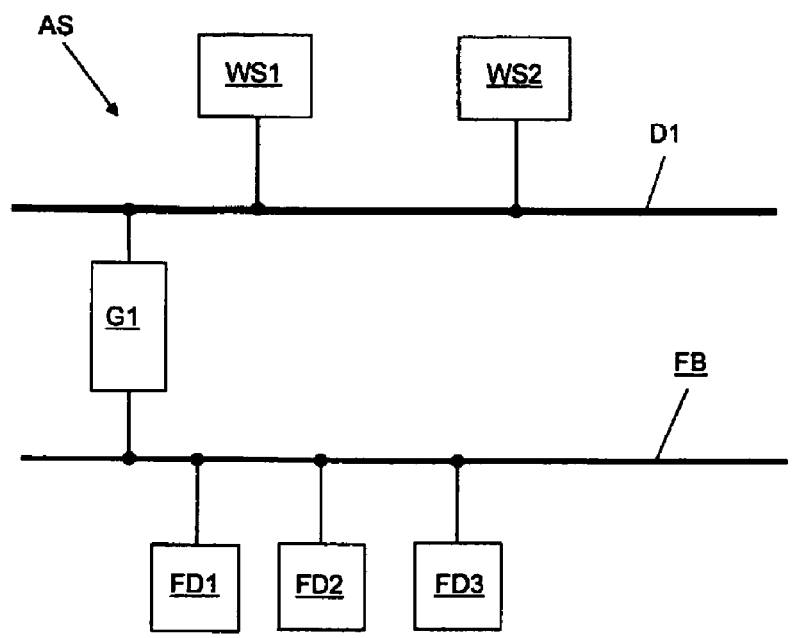
FIG. 1 a block diagram of a decentralized automation system.

FIG. 1 shows schematically a typical decentralized automation system AS, which is composed of a data bus D1, to which a plurality of work stations WS1, WS2 are connected, which serve as control systems, or control units. Data bus D1 works, for example, according to the Ethernet standard. Via a gateway G1, data bus D1 is connected with a fieldbus FB. Connected to the fieldbus FB are a plurality of field devices FD1, FD2 and FD3, which serve as sensors or actuators for process control. Fieldbus FB works e.g. according to the Profibus standard or the Foundation Fieldbus standard.

Figure 2:
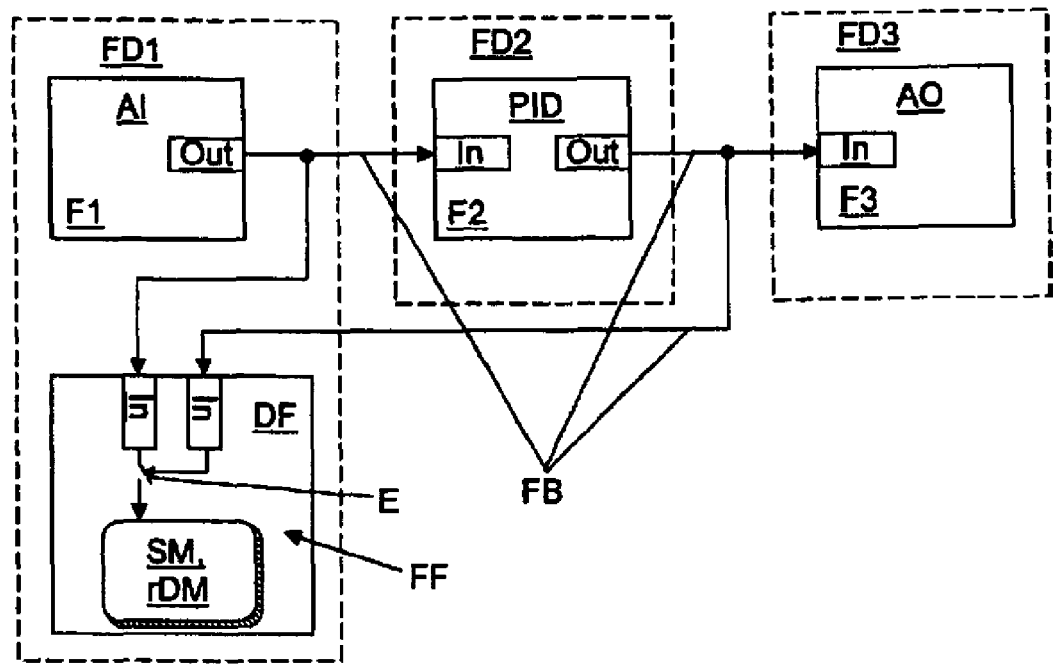
FIG. 2 a block diagram of the apparatus of the invention with a data storage function block.

FIG. 2 shows a simple control circuit of an automation system AS with an analog input AI in the first field device FD1, a PID-controller PID (Proportional-Integral-Derivative) in the second field device FD2 and an analog output AO in the third field device FD3, with two branch points, or taps, of the connection paths. These taps lead to the data storage function block DF, which is located in the first field device FD1. The storage medium SM is integrated fixedly in the first field device FD1. In a further example of an embodiment, the storage medium SM can be embodied as a removable data carrier rDM.

If, for example, a critical, or certain, state signal is on the output of the PID-controller, then the storing of the value delivered from the analog input AI is triggered by the data storage function block DF and the value is stored by the data storage function block DF in the storage medium SM. For example, in the case of driving a safety-directed actuating controller to "100% up", the associated fill level value can be recorded, in order later to document, to what extent the tank reached its capacity limit.

In order to enable universal storage of data in a field device FD, a freely parameterable data storage function block DF is provided, which is embodied as a flexible function block FF. Flexible function blocks are known from, among other sources, the Foundation Fieldbus and Profibus specifications. They can be integrated simply into the control circuit of a decentralized automation system.

Parametered, in this instance, can be, among others, the storage criterion, e.g. each new piece of data, one per minute, only special, or erroneous, values, but, especially also logic combinations over a plurality of inputs, so that the one or more outputs of other field devices can control the storing. For example, the starting of a pump and/or the switching of a limit-level sensor, which represents a special, possibly critical, process situation, can trigger the storage process by the logic combination of these states, or their signals. The data storer is fixedly integrated in the field device FD. It can, however, also be embodied as a removable data carrier rDM, in order to archive the recorded data or to analyze it on a personal computer at a location external to the automation system.

Figure 3:
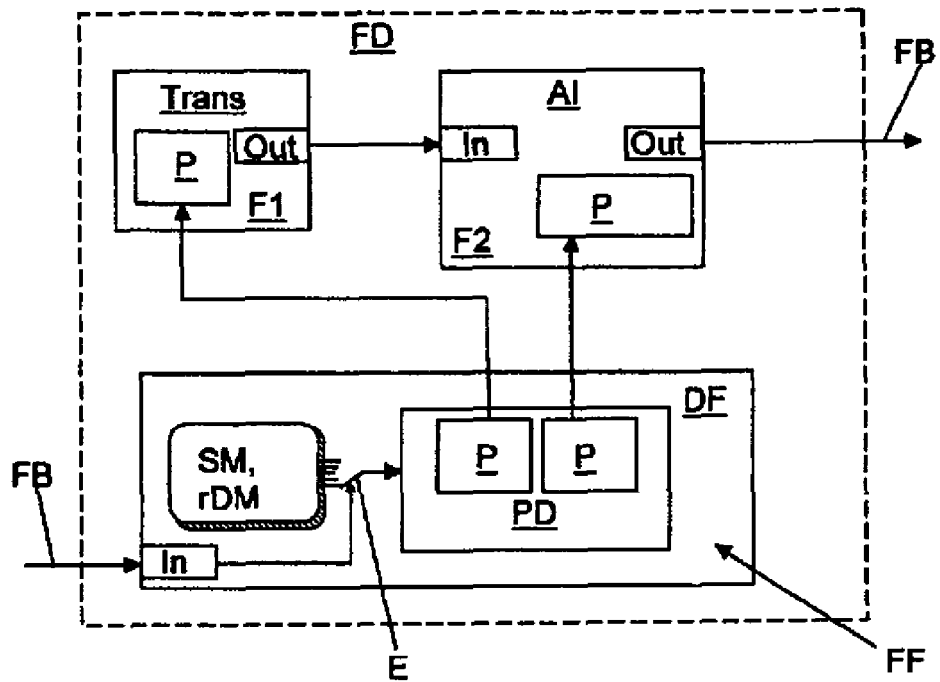
FIG. 3 a block diagram of the apparatus of the invention for autonomous parametering of function blocks.

FIG. 3 shows a schematic makeup of a simple field device FD, including a transducer function block Trans for measured value generation and an analog input function block AI for measured value output. The parameters P, with which the two function blocks F work, can, in this example of an embodiment of the invention, be changed via parameter data sets PD stored in the storage medium SM. The input interface E of the data storage function block DF controls both the point in time of the acceptance as well as also which parameter data set is valid. This can be done via the process control system. Advantageously, all parameters do not need to be written separately into the field device, but, instead, a single input In can be used on the data storage function block DF for the switch over. By a direct sampling of a process variable, it is, furthermore, possible autonomously to recognize changed process conditions and to operate with the parameters P fitting such situation. If the data storage function block recognizes at its input In, for example, the signal for starting a stirring blade in a tank, then the field device FD can operate with a corresponding data set PD, which, accompanied by loss in accuracy, which is otherwise an absolute requirement, the rotation of the stirring blade is taken into consideration in the measurement and evaluation and masked out. If the signal for starting or operating of the stirring blade is turned off, so that the rotation of the stirring blade stops, then switch back to the old parameter data set PD with increased accuracy occurs. A further situation in which a change of the parameter data set PD is required, is a filling procedure, or media change in a tank, which is recognized by a switch-on signal of a pump at the input In of the data storage function block DF of the field device FD.

The input interface E reads, due to this signal, the corresponding parameter data set PD out of the storage medium and outputs this to the individual function blocks F. Serving as triggering criterion can be, further, a signal at the input In of the field device FD indicating a changed density of the medium to be measured, whereby a corresponding data set is loaded, which serves for adjusting the parameters P of the function blocks F of a fill-level measuring system dependent on density.

A further important function of the described data storage function block DF is the opportunity for changing parameters P of the field device FD during operation as a function of the particular existing process situation and independently of a connected parametering tool, such as e.g. SysCon or DeltaV. for this purpose, all function blocks F within the field device FD participating in the automation system AS have the opportunity to accept values of the data storage function block as new parameters P. The point in time of the acceptance of a new parameter data set is controlled, also here, by process values, which can come from the outside. By the variable embodying of the storage medium SM as a removable data carrier rDM, also here diverse advantages are presented, e.g. the device can be comfortably and quickly preparametered at another location.

The invention claimed is:

1. A field device for data- and parameter-processing in a decentralized automation system, the system having a field bus connected to the field device and further connected fieldbus components which communicate with other fieldbus components via the field bus, wherein a unified automation system is formed of a plurality of encapsulated function blocks, which run in a decentralized manner in the individual fieldbus components of the fieldbus and which communicate with other fieldbus components, comprising:
a data storage function block, which accepts data and/or parameters of other function blocks on the basis of a time-controlled or event-controlled criterion and stores such in a storage medium provided in the field device, wherein:
said data storage function block outputs data or parameters stored on the basis of a time-controlled or event-controlled criterion from a storage medium provided in the field device and transfers such to appropriate function blocks;
said data storage function block is embodied for an autonomous parametering of the function blocks in the field device, such that the new data and/or parameters are loadable into said function blocks of the field device from the storage medium of said data storage function block; and
said function blocks meet specifications of Profibus or Foundation Fieldbus.

2. The field device as claimed in claim 1, wherein:
said data storage function block is embodied as a parameterable, flexible function block in the field device.

3. The field device as claimed in claim 1, wherein:
the time-controlled or event-controlled criterion of at least one function block in the decentralized automation system outside of the field device with said integrated data storage function block starts the re-parametering process or the storage routine.

4. The field device as claimed in claim 1, wherein:
the storage medium situated in the field device or in the fieldbus components is embodied as at least one removable data carrier.

5. The field device as claimed in claim 2, further comprising:
an external device located outside of the decentralized automation system for storing the data and parameters in said at least one removable data carrier and thus provides for an external preparametering of the function blocks in the decentralized automation system.

6. The field device as claimed in claim 3, further comprising:
an external device situated outside of the decentralized automation system for reading the stored data and/or parameters out of said removable data carrier and externally analyzes and further processes the stored data and/or parameters.

7. The field device as claimed in claim 3, wherein:
the stored data and/or parameters are stored in said removable data carrier as structured data, for example as a database, XML-format.

8. The field device as claimed in claim 1, wherein:
the time-controlled or event-controlled criterion, which triggers a storage routine of data and/or parameters of said function blocks in said data storage function block, is at least one critical, limit-value datum and parameter, a state at the input, or a logic combination of a plurality of states at the inputs of said data storage function block or a certain time sequence.

9. The field device as claimed in claim 1, wherein:
the plurality of encapsulated function blocks have specifications of Profibus or Foundation Fieldbus standards.

10. The field device as claimed in claim 1, wherein:
said data storage function block accepts data and parameters of other function blocks on the basis of a time-controlled or event-controlled criterion and stores such in the storage medium provided in the field device.

* * * * *